Patented July 25, 1933

1,919,329

UNITED STATES PATENT OFFICE

CARLETON HENNINGSEN, OF BUFFALO, NEW YORK, ASSIGNOR, BY MESNE ASSIGNMENTS, TO DU PONT RAYON COMPANY, OF NEW YORK, N. Y., A CORPORATION OF DELAWARE

PURIFICATION OF CELLULOSE

No Drawing. Application filed January 16, 1928. Serial No. 247,262.

This invention relates to an improvement in the manufacture of films, threads and the like from cellulosic materials, and more particularly it relates to improvements in the manufacture of viscose.

It has been known that the strength of rayon threads is dependent, among other things, on the percentage of alpha cellulose in the finished thread. It has been known that the strength of the rayon is dependent on the alpha cellulose content of the original raw material, and attempts have been made to prepare for rayon manufacture wood pulp having a notably high alpha cellulose content.

It has also been shown that it is necessary to preserve the high alpha cellulose content of the raw material throughout the rayon process, and processes have been developed which more or less promote this idea.

In the art of manufacturing viscose as practiced at the present time, it is customary to treat sheets of wood pulp or other cellulosic material with sodium hydroxide, commonly known as caustic soda. The excess caustic soda is pressed from the alkali cellulose and this material is xanthated by treatment with carbon bisulfide. Before the xanthating step, however, it is usual to shred the alkali cellulose and allow it to age for a long period (sixty to seventy hours) in order to produce later a viscose solution of low viscosity and one that presents no difficulty in liquid transfers, in filtering and in spinning.

The alkali cellulose before ageing is relatively high in alpha cellulose, especially if a high grade raw material is used. However, this alpha cellulose content is very materially reduced by the ageing step, which is probably caused by the fact that this ageing gives an opportunity for oxidation and degradation of the cellulose, and that the oxidation and degradation products become incorporated in the material. There are also present in the alkali cellulose at this stage hemi-celluloses and other impurities which were originally present in the wood pulp or other cellulosic material from which the alkali cellulose is formed. These, together with the oxy-celluloses and other degradation products which are formed during the shredding, ageing and ripening operation, are highly detrimental to the rayon which is made from the resulting viscose, particularly with respect to its strength when wet.

Therefore, one of the objects of my invention is to provide a purified material which may be converted into alkali cellulose and then immediately xanthated, that is to say, without an intermediate step of ageing. Of course, it is obvious that before xanthation the necessary removal of the excess caustic and the mechanical disintegration will be effected. By the term "immediately" I do not mean instantaneously, but within a time which is relatively very short compared with the long time taken in the ageing step in present practice.

Another object is to provide a cellulose containing a high percentage of alpha cellulose, which can be converted into alkali cellulose and then xanthated without an intervening step of ageing.

Another object of my invention is to provide a method of manufacturing films, threads and the like from cellulose which permits the xanthation of the alkali cellulose immediately after its formation from the refined cellulose.

Still another object is to provide a method of making a material which may be used as described above without ageing before xanthation.

My invention will be best understood from the following description in which I shall describe one form of my invention. Though I refer specifically to wood pulp, it is obvious that cotton or other cellulosic material could also be used.

The wood pulp which preferably forms the raw material is available in the open market. This pulp may then be treated in the usual way, as with 18% caustic in a steeping press for fifty minutes at 18° C. It may be pressed until the pressed material weights approximately three times as much as the dry wood pulp used. The pulp may then be shredded in a Werner & Pfleiderer mixer for about one and one-half hours and the shredded material then aged for approximately sixty hours at about 23° C. This material, both before and after ageing, is alkali cellulose, but after the ageing the viscosity of a solution of this cellulose will be such as permits filtering, spinning, etc. It has been customary to xanthate the alkali cellulose immediately after the ageing. However, as has been pointed out above, the ageing is accompanied by the formation of oxy-celluloses and other degradation products.

According to my invention I treat the aged alkali cellulose with 9% caustic soda for about thirty minutes at 20° C., the proportions being ten parts by weight of the aged alkali cellulose to sixty parts of 9% caustic soda, the alkali cellulose comprising the alkalized wood pulp and the free caustic liquor present. This material is then centrifuged, when it may again be treated with 9% caustic soda for another thirty minutes and then centrifuged again and washed in the centrifuge until it is free of caustic soda. The material may then be removed and dried twelve hours at a temperature below 150° F.

A cellulose resulting from the above treatment is substantially free from impurities and a solution thereof has the desired viscosity. The cellulose is also relatively high in alpha cellulose and shows no loss in its resistivity. Normally wood pulp has an alpha cellulose content of between 85%–95% and a solution thereof has a viscosity of 15–35. The cellulose as refined by my preferred process, as outlined above, has an alpha cellulose content of 98%–99% and a viscosity of 5 or preferably approximately 2.

It may be, as hereafter described, converted without the ageing step into a viscose solution having a viscosity suitable for spinning or casting.

When it is desired to use this refined cellulose in the manufacture of viscose, it may be converted into alkali cellulose by steeping in a solution of caustic soda, and then may be centrifuged, disintegrated and xanthated without an intermediate ageing step.

While it is true that my method of preparing a refined cellulose does include the step of ageing the material while in the form of alkali cellulose, the resultant refined cellulose when used as a raw product for the manufacture of viscose may be converted into alkali cellulose and then xanthated without an intervening step of ageing, and thereby enables one to produce a viscose which may be spun into rayon having superior physical properties.

It is to be noted that this raw material which I have produced is not alkali cellulose, because it has been washed free from caustic soda including the sodium combined with the cellulose. However, it may be readily converted back into alkali cellulose by treatment with caustic soda and then may be xanthated without an intermediate ageing step.

By forming the material as described above, the resistivity of the cellulose both physically and chemically is maintained more nearly at its original point than when other means of reducing the viscosity are used. By the term "resistivity" is meant the indifference of the thread to attacks by the chemical and physical treatments to which the thread is subjected during its manufacture and use. At the same time the high alpha content is maintained and the viscosity of the solution is reduced to the desired amount. Rayon produced by the viscose process from such cellulose has an improved strength, both wet and dry, increased elongation, improved whiteness and shows no loss in its resistivity to acids.

The method outlined above may be varied considerably. For example, after ageing, the treatment with caustic soda may be performed in one or more operations with caustic soda of from 8%–18% instead of in two treatments with 9% caustic soda in each treatment.

It is obvious from what has been said above that, in the preparation of the refined cellulose, the process may be carried as far as the step of washing the aged alkali cellulose with caustic soda, and that this purified alkali cellulose may be xanthated without the steps of washing with water, drying and mercerization. It is only necessary to see that the last caustic soda wash is of 17%–18% strength to insure the proper ratio of alkali to cellulose for the xanthation. In this case, the process is not directed to a refined cellulose, but to a refined alkali cellulose, but the governing principles are identical. These are merely given as examples of different changes which may be made in the method and it is appreciated that other changes will readily suggest themselves to those skilled in the art.

The material may be made by other methods than that outlined above. For example, it may be made by treating the pulp with caustic soda, at a high temperature or with stronger concentration of caustic soda, although these methods are not so desirable. However, this latter method avoids the ageing step in the above preferred process. No matter which of these methods is employed, however, I wish to emphasize the fact that the ageing step is removed from the viscose process. It may be found desirable to incorporate the ageing step in the making of my refined cellulose, but any deleterious products formed by the ageing are removed before the finished material is formed.

The specific reference to either the percentage of alapha cellulose or to the viscosity does not have any significance unless the method by which the percentage and the viscosity are determined is described.

I will therefore give the methods employed for these determinations.

*Method for the determination of alpha cellulose in pulp*

A five-gram sample, cut into one-half inch squares, is treated in tall 200 cc. beakers with 50 cc. of 18% sodium hydroxide, allowed to stand one minute, and then treated with another 50 cc. and mashed with a flattened stirring rod, the temperature being kept at 20° C. It is steeped exactly 30 minutes and drowned in 200 cc. of water. It is filtered on a Buchner funnel and washed with one liter of cold water followed by 100 cc. of 20% acetic acid. The washing of the alpha cellulose on a Buchner funnel is continued with one liter of hot water. The Buchner funnel is then dried in the oven at 105° C. and the alpha cellulose is then transferred to a weighing bottle and dried at 105° C. to a constant weight.

*Method of analysis for cuprammonium viscosity of pulp*

Three grams of bone-dry pulp is put into a 250 cc. Erlenmeyer flask with 112 cc. of concentrated ammonium hydroxide, and allowed to digest for three hours at 25° C., then 4.5 grams cupric hydroxide is added, the flask tightly stoppered and shaken until the solution is complete. The viscosity is determined in a pipette viscosimeter; that is, a 100 cc. pipette adjusted to deliver 100 cc. of water in 30 seconds at 25° C. The time in seconds of the cuprammonium cellulose flow, divided by 30, gives the cuprammonium viscosity.

When I refer to the viscosity of cellulose or of alkali cellulose in this application, I am referring to the viscosity of a cuprammonium solution of that cellulose as determined by the above described method.

I claim:

1. A cellulosic material to be used in the manufacture of rayon, said cellulosic material containing 98% to 99% of alpha cellulose and capable of forming a solution having a viscosity of 2.

2. A cellulosic material to be used in the manufacture of rayon, said cellulosic material comprising alkali cellulose made from cellulose containing 98% to 99% of alpha cellulose, said cellulose being capable of forming a solution having a viscosity of 2.

3. In the manufacture of viscose, the steps of producing an aged alkali cellulose, washing said alkali cellulose with a caustic alkali solution to remove the impurities and xanthating.

4. In the manufacture of viscose, the steps of producing an aged alkali cellulose, treating said alkali cellulose with a caustic alkali solution, washing free of caustic alkali, steeping in a caustic alkali solution again and xanthating.

5. In the manufacture of viscose, the steps which comprise forming aged alkali cellulose, treating said aged alkali cellulose with a caustic alkali solution and removing the caustic alkali therefrom to produce a material from which alkali cellulose may again be produced.

6. In the manufacture of viscose, the steps which comprise forming aged alkali cellulose, treating said alkali cellulose with a caustic alkali solution, centrifuging, again treating with a caustic alkali solution, washing free of caustic alkali and drying.

7. In the manufacture of viscose, the steps which comprise treating aged alkali cellulose with a caustic alkali solution, washing until free of caustic alkali and then alkalizing again.

8. In the manufacture of viscose, the steps which comprise treating aged alkali cellulose with a caustic alkali solution, centrifuging, washing until free of caustic alkali and then alkalizing again.

9. In the manufacture of viscose, the steps which comprise treating alkali cellulose with a caustic alkali solution, centrifuging, again treating with a caustic alkali solution, centrifuging, washing and finally drying.

10. In the manufacture of viscose, the steps which comprise treating aged alkali cellulose with 9% sodium hydroxide solution, centrifuging and again treating with 9% sodium hydroxide solution, centrifuging, washing and drying.

11. In the manufacture of viscose, the steps which comprise treating alkali cellulose with a caustic alkali solution at a temperature of approximately 20° C., washing and again forming alkali cellulose.

12. In the manufacture of viscose the steps which comprise treating aged alkali cellulose with a solution containing 8% to 18% caustic alkali, washing free of caustic alkali, drying, again forming alkali cellulose, and xanthating.

CARLETON HENNINGSEN.